J. CLAY.
INTERNAL COMBUSTION ENGINE.
APPLICATION FILED MAR. 27, 1905.

901,278.

Patented Oct. 13, 1908.
5 SHEETS—SHEET 1.

Witnesses
H. M. Kuehne.
J. A. Percival.

Inventor
John Clay
By Richards
Attorneys

J. CLAY.
INTERNAL COMBUSTION ENGINE.
APPLICATION FILED MAR. 27, 1905.

901,278.

Patented Oct. 13, 1908.
5 SHEETS—SHEET 3.

Witnesses.
H. W. Kuehne
John A. Percival

Inventor
John Clay
by Richardson
ATTORNEYS

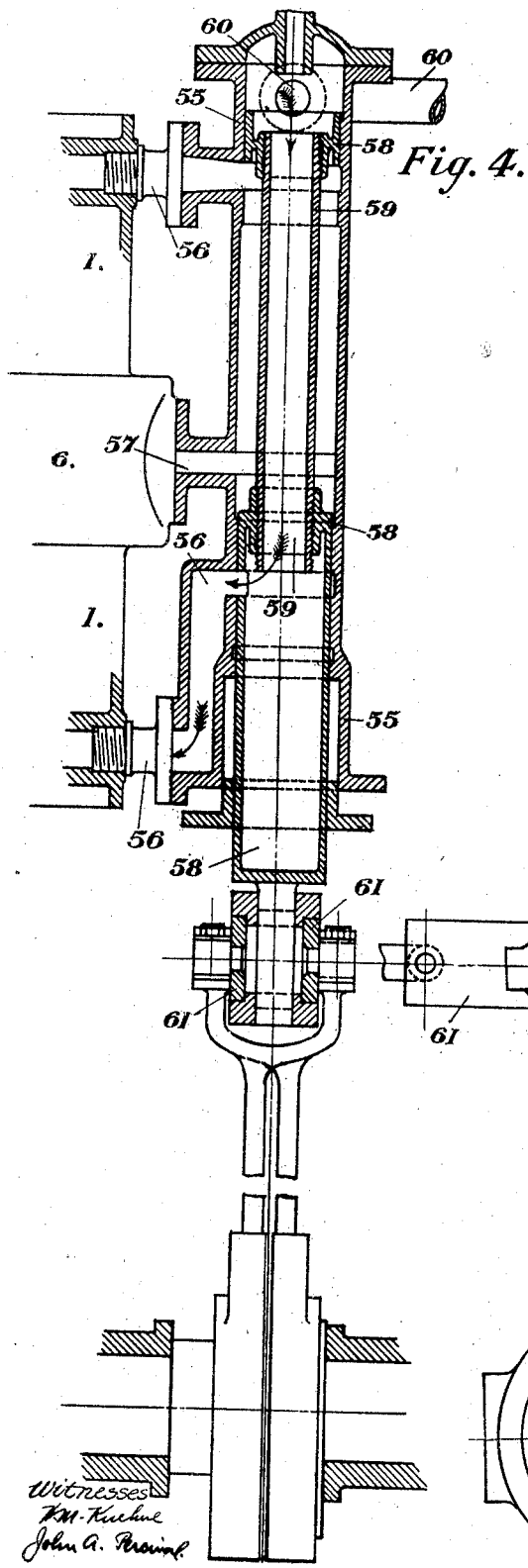
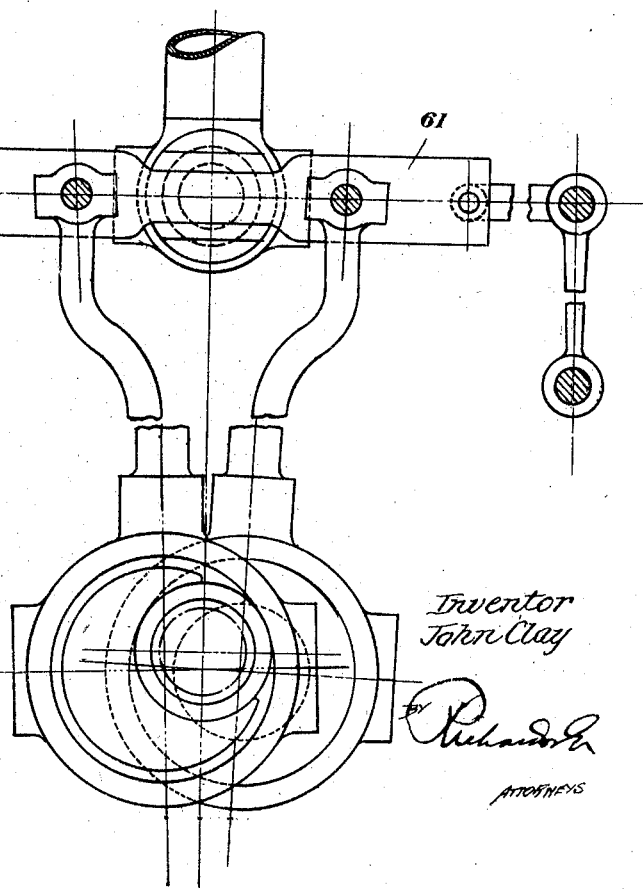

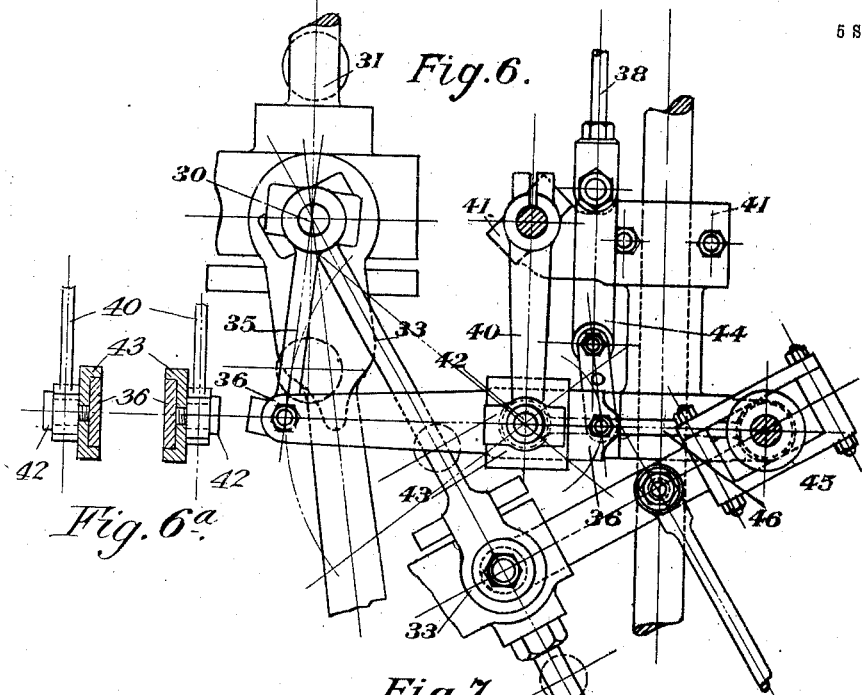
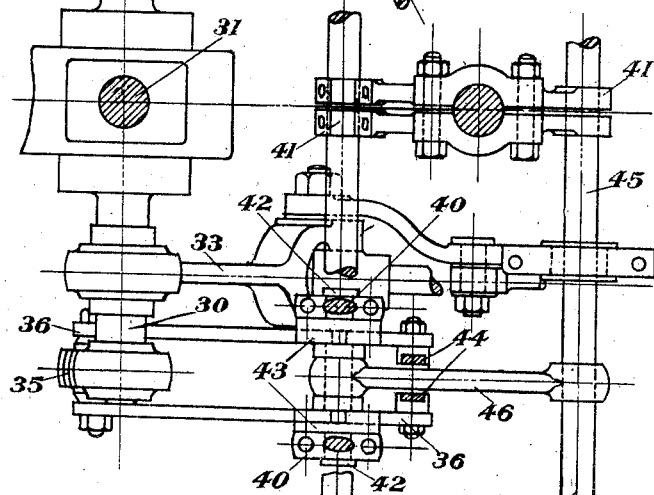
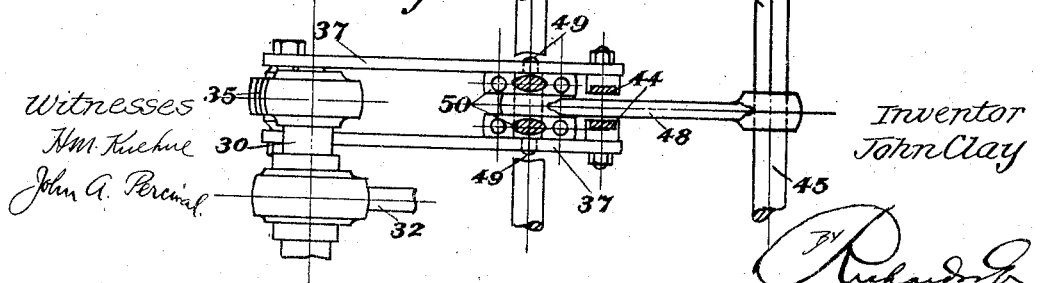

UNITED STATES PATENT OFFICE.

JOHN CLAY, OF ROCK FERRY, ENGLAND, ASSIGNOR TO THE EMPIRE OIL ENGINE SYNDICATE LIMITED, OF LONDON, ENGLAND.

INTERNAL-COMBUSTION ENGINE.

No. 901,278.　　　Specification of Letters Patent.　　　Patented Oct. 13, 1908.

Application filed March 27, 1905. Serial No. 252,395.

*To all whom it may concern:*

Be it known that I, JOHN CLAY, a subject of the King of England, residing at 64 Mersey road, Rock Ferry, in the county of Chester, England, have invented new and useful Improvements in Internal-Combustion Engines, of which the following is a specification.

This invention has reference to internal combustion engines, and has primarily for its object and effect, among others, to provide an engine which is self-starting, reversible, and controllable, both as to the degree of energy or power of the combustible fluid introduced, and the general maneuvering characteristics, as well as being simple in its construction, and mode of operating the parts.

Figure 1:
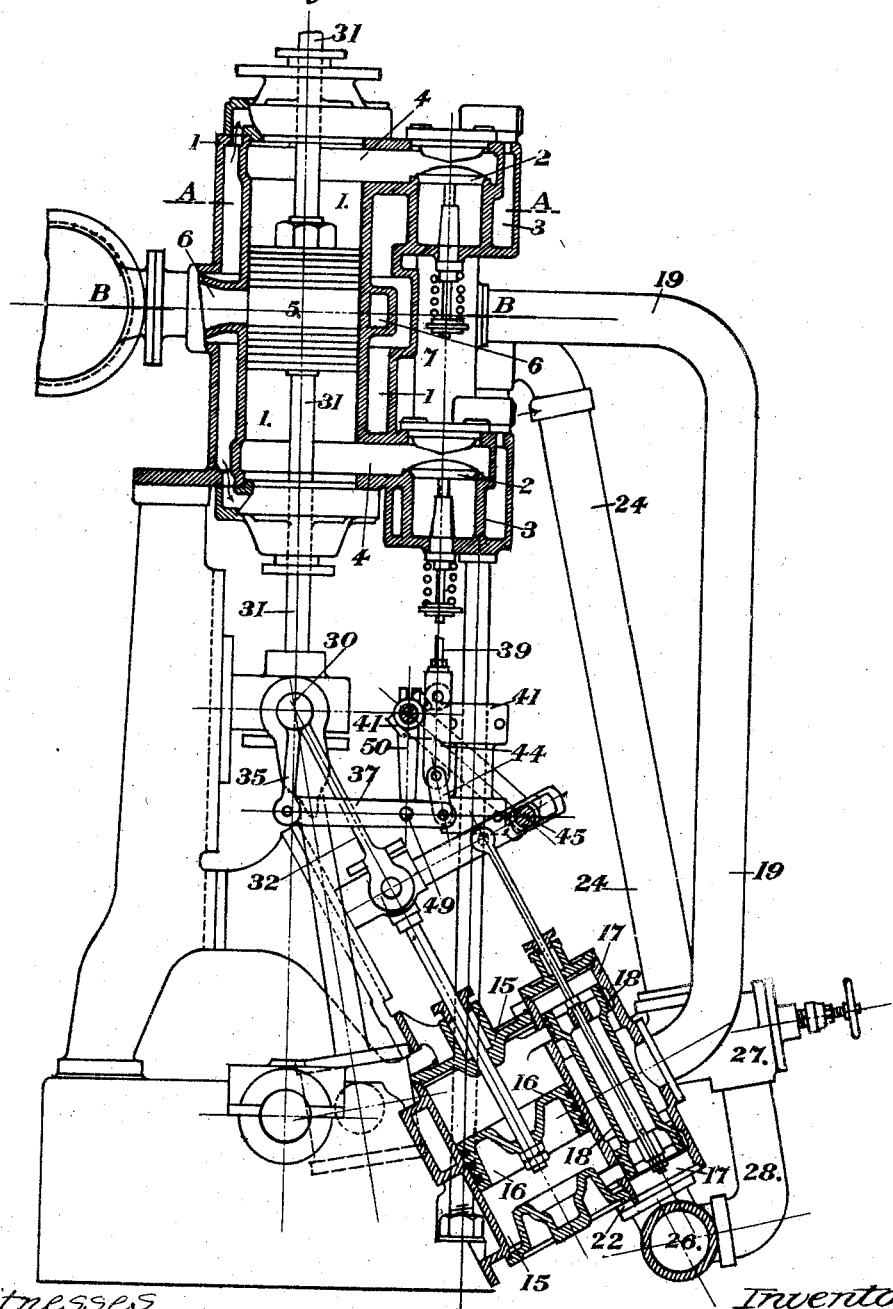
Figure 2:
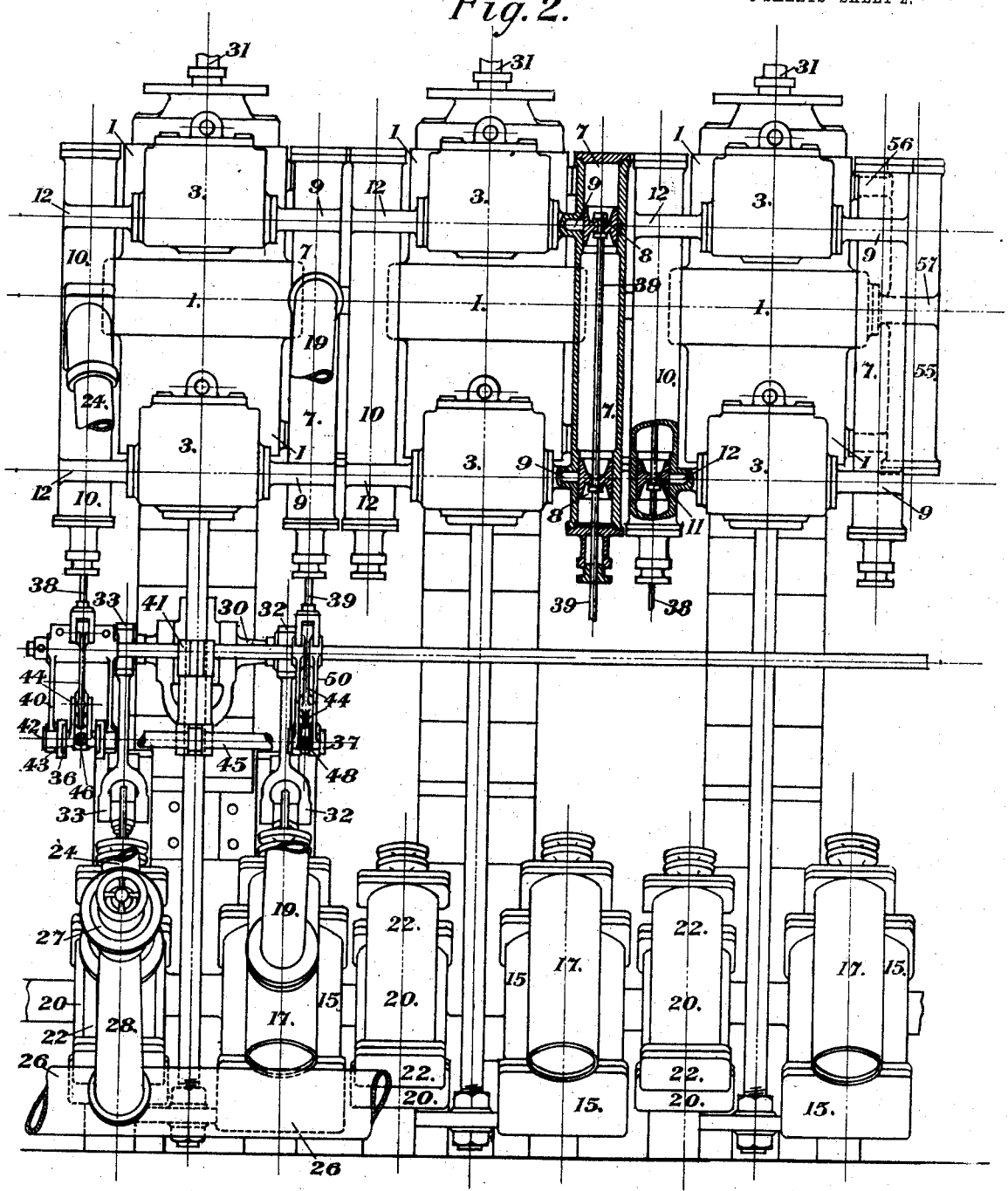
Figure 3:
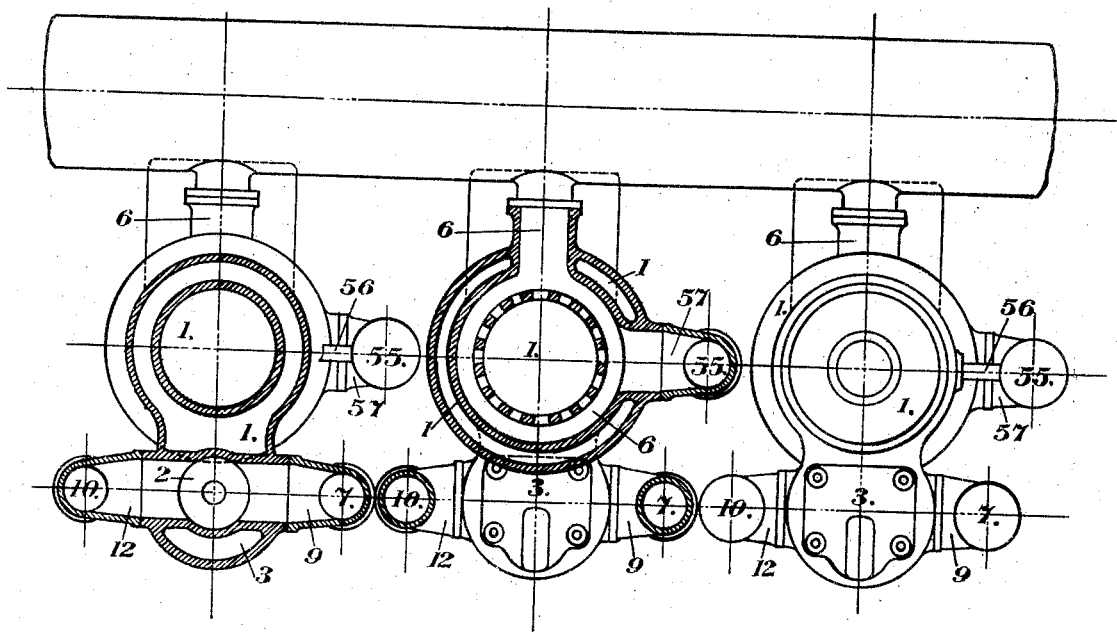

The engine will be described in connection with the accompanying drawings, in which Figure 1 is a side elevation partly in section; Fig. 2 is a front view; and Fig. 3 is a plan; the engine being a three-cylinder one, with cranks at about 120° from one another; but each cylinder and the parts connected with it, constitutes practically a separate engine, all being identical; and each cylinder is adapted to give a propelling or effective working stroke at each end, each revolution. Fig. 4 is a sectional elevation; and Fig. 5 is a side view of the reversing valve and mechanism. Fig. 6 is a side elevation of the mixture valve operating gear. Fig. 6ᵃ is a sectional detail of the connection between lever 36 and arms 40. Fig. 7 is a plan of the parts shown in Fig. 6, and Fig. 8 is a plan of the air valve operating gear.

The engine hereafter described is constructed and adapted to use, as its combustible working fluid, air and atomized or vaporized oil; but it is in part applicable in cases where the fuel is gas and air.

In the engine illustrated, according to this invention, each cylinder 1 has connected with it, two lift valves 2, one at the top, and the other at the bottom, the casings 3 of which communicate by ports 4 with the two ends of the cylinders on the opposite sides of the piston 5; while at the center of the cylinder, there is an annular exhaust port 6, communicating with it by a number of openings in the cylinder wall, and through which, the exhaust of the gases at the ends of the strokes of the piston takes place in each direction. That is, the exhaust port 6 is common to both ends of the cylinder, and the piston uncovers and closes it, alternately, at the opposite ends of its strokes, in the well known way.

In connection with each cylinder, there is a valve casing 7, with a valve 8 working in it, and communicating at its two ends with the valve casings 3 below the valves 2, by ports 9. This valve is for controlling the distribution of air supplied to the cylinder by an air pump, as hereinafter described. There is also connected to the cylinder, a casing 10 similar to 7, having within it a valve 11, and communicating at each end with the valve casings 3 below the valves, by ports or branches 12. This valve is for controlling the flow of combustible mixture to the opposite ends of the cylinder as hereinafter described, such mixture being supplied by a force pump.

The air is adapted to be supplied to the opposite ends of the cylinder by the valve 8, it being forced, at low pressure, say 5 lbs., by its pump, when the exhaust port 6 is uncovered by the piston 5; and this air serves to force or sweep out the products of combustion remaining in the cylinder after the ports 6 are first opened by the piston, and then to constitute a body of free air in the cylinder, next the piston, during the compressing or return stroke of the piston, and the following outward effective or propelling stroke. In its flow, the air, and the combustible mixture, uplift the spring-held valve 2, which acts as a non-return valve to both, and cuts off communication between the interior of the cylinder, and the valve ports 9 and 12.

With regard to the combustible mixture, this is supplied by its pump, and is adapted to be admitted by its valve at a point when the piston 5 is about a half or three-fourths of its compressing or inward stroke, the mixture being forced in under a force of about 5 lbs. The combustible mixture will therefore lie more or less as a lamina, at the end of the cylinder, and the air will lie as a body, isolating the mixture from the piston, and when the charge is compressed, the mixture is fired by electric or other ignition, at the end of the cylinder.

With regard to the pumps for the air and mixture respectively, 15 represents the air pump cylinder, 16 its piston, 17 the valve casing, and 18 the distribution valve therein;

and the air in this pump is forced up into the cylinder valve casing 7 through the pipe 19, which connects the pump valve casing, and the valve casing 7 together.

The combustible mixture or fuel pump cylinder is similar in construction to that of the air and mixture pump already described, and is designated 20, and has a piston similar to 16.

22 is the distribution valve casing, having a distributing valve therein similar to 18. This valve casing 22, and the cylinder valve casing 10 at the center, are connected together by the supply pipe 24; the supply pipe to the valve casing 22 from the mixture service, being by a pipe 26 on one end of the casing 22, the mixture being supplied to the opposite ends of the casing 22 through the valve itself, which is hollow.

A spring-pressed relief valve 27 is provided on the supply pipe 24, by which, when pressure in the mixture pump exceeds that required, say 5 lbs. to 10 lbs., and the cylinder valve ports are closed, escapes back by way of the by-pass branch 28 into the inlet or suction pipe 26. The pistons of these air and mixture pumps are worked from the cross-head pin 30, of the piston rod 31, by connecting rods 32 and 33, respectively.

With regard to the regulation of the charge of combustible mixture supplied to the cylinder, this is effected by giving the mixture valve 11 a variable stroke, so as to cause the ports leading from the valve casings 10 to the cylinder to be opened a lesser or greater extent. The valves 11 and 8 are operated from similar mechanisms, driven from the ends of the projecting parts 30 of the crosshead pin or rod, which works the pump connecting rods 32 and 33, and the two ends of the projections 30, operate by connecting rods 35, levers 36, 37, connected with the mixture valve and air valve spindles 38 and 39, respectively. The lever 36 is held, that is, suspended by the arms 40, carried from a bracket 41, fixed on the columns of the engine; the lower end of such arms grasping trunnions 42 on blocks 43, which embrace and support the lever bars 36. The outer ends of these lever bars are connected to the valve spindles 38 and 39 by links 44.

The position of the blocks 43 on the levers 36, and the degree of movement which will be imparted to the valve 11 by this valve gear, is governed by the position of the blocks 43, which are moved nearer to and further from the valve connecting links 44, by swinging the suspension arms 40 about their fulcrum in the bracket 41, by any suitable hand operated lever or device—not shown, the levers 36 being kept in the same position in the horizontal plane by the link 46, which is connected at one end to the levers 36, and at the other to the rod 45.

With regard to the air valve-operating levers 37, these are prevented from moving in the horizontal direction, by the link 48, connected at one end to the shaft 45, and grasping a pin 49 at the other, which passes through the levers 37; this pin being also grasped by suspender rods 50, carried from a bracket 51 on the engine front columns. Thus, by merely adjusting the position of the blocks 43, the amount of opening of the mixture controlling and distributing valve can be varied, and the quantity of mixture admitted to the cylinder, and the consequent pressure and power due to combustion of the mixture varied. The movement of the air valve will be constant.

The reversing of the engine is effected by a valve placed on the side of the cylinder, and connected with the cylinder above and below the piston, and also with the exhaust belt 6 of same. This valve is worked by a Stevenson eccentric and link motion, the link being operated, that is, thrown over in one direction or the other, or held in the center, by suitable hand operating lever and means on the shaft 45, which will be rocked axially in its bearings. This valvular arrangement (see Figs. 4 and 5), comprises a case 55, having a port 56 at the top and bottom, connected with the interior of the cylinder above and below the piston; and a port 57 connected with the exhaust port 6; and the valve itself consists of a piston 58 at each end on a tube 59, and working in connection with the ports 56. Compressed air or other gas is led to the casing 55 by the pipe 60. Normally, when the engine is running, the link 61 will be moved to the central position, and the pistons 58 will cover the ports 56; and the valve will receive no motion from its eccentrics.

To reverse the engine, the valve operating gear of the mixer valves 11 is operated, so that these valves will not open their ports, and no mixture will be supplied to the cylinders; and then the links 61 of the reversing valves are thrown over to one end or the other, accordingly as it is necessary to operate the valves, to cause the engine to run in the direction required; and this will put one end of the cylinder, by the port 56, in communication with the exhaust port 57, while the other end will be put in communication with an air reservoir containing air under pressure, as shown in the drawings, and air may then pass by the pipe 60 from this reservoir into the other end of the cylinder, and will press the piston towards the end of the cylinder which has been exhausted.

The piston valves 58 thus act as simple reversing distribution valves. When the engine has started, then the links 61 can be thrown to the center, or neutral position again, and the gear of the mixer valves 11 can be set to open these valves, and again supply the mixture to the cylinders. Of course, suitable igniter devices will be used at the required points in the cylinder to ignite the charge; and have means connected with them for throwing them in and out of action, as and when required.

If desired, instead of air being used to start the engine, combustible mixture under pressure may be stored in a reservoir, and be supplied similarly to the air, as just described: in which case, of course, when such mixture is supplied by the engine and compressed, it will be fired similarly as when the engine is running normally, after being started. In either case, the reservoir, whether air or mixture be used, will be charged by a suitable pump.

The engine illustrated is a double acting one, employing combustible mixture on each side of the piston, and firing such mixture at each outward stroke of same from each end; but it will be plain, that if it be required that combustion at one end only of the cylinders be employed, the engine will work and be operated similarly as above described, with the exception that the various valves, or portions of the valves, used in connection with the end of the cylinders not required in that case, will be dispensed with.

What is claimed is:—

1. In an internal combustion engine, a cylinder, a piston working therein, a mechanically operated valve for regulating and admitting combustible mixture to the cylinder, a fluid pressure reservoir, a separate reversing valve, communicating with the cylinder and the said reservoir by passages, and adapted to act as a combined inlet and exhaust valve, a link and double eccentric motion for operating said valve, variable throw lever mechanism connected with the combustible mixture supply controlling valve for varying the stroke of the same.

2. In an internal combustion engine, a cylinder 1, a piston 5 working in it, a mechanically worked valve 11 for distributing and controlling the supply of combustible mixture to the cylinder, a pump 20 for supplying the combustible mixture, the distribution and flow of which is controlled by said valve, a mechanically moved valve 8 for distributing and controlling the supply of air to the cylinder, and an air pump 15 for supplying air to the cylinder, the distribution and flow of which is controlled by said valve 8.

3. In an internal combustion engine, the combination of cylinder 1; a piston 5; said cylinder having fluid inlet conduits at the ends thereof, and an exhaust port 6 at the center thereof; an automatic non-return valve 2 in each inlet conduit; a valve chest 3 below the valve 2; a valve 8 for controlling and distributing the supply of air; a valve casing 7; pipes 9 communicating between the valve casing 7 and the valve casing 3; a valve 11 for regulating and controlling the supply of combustible fluid; a casing 10 in which the valve 11 works; and pipes 12 communicating between the valve casing 10 and the valve casings 3 at each end; substantially as set forth.

4. In an internal combustion engine, the combination of cylinder 1, a piston 5; said cylinder having fluid inlet conduits at the ends thereof, and an exhaust port 6 at the center thereof; an automatic non-return valve 2 in each of the ports 4; a valve chest 3 below the valves 2; a valve 8 for controlling and distributing the supply of air; a valve casing 7; pipes 9 communicating between the valve casing 7 and the valve casing 3; a valve 11 for regulating and controlling the supply of combustible fluid; a casing 10 in which the valve 11 works; pipes 12 communicating between the valve casing 10 and the valve casings 3; an air pump 15 operated from the engine; a conduit 19 connecting the air pump delivery with the valve casing 7; a combustible mixture pump 20 operated by the engine; and a conduit 24 connecting the combustion pump delivery with the valve casing 10; substantially as set forth.

5. In an internal combustion engine, the combination of cylinder 1, a piston 5; said cylinder having fluid inlet conduits at the ends thereof, and an exhaust port 6 at the center thereof; an automatic non-return valve 2 in each of the ports 4; a valve chest 3 below the valve 2; a valve 8 for controlling and distributing the supply of air; a valve casing 7; pipes 9 communicating between the valve casing 7 and the valve casing 3; a valve 11 for regulating and controlling the supply of combustible fluid; a casing 10 in which the valve 11 works; pipes 12 communicating between the valve casing 10 and the valve casings 3 at each end; and a reversing valve 58.

In testimony whereof I have signed my name to this specification in the presence of two subscribing witnesses.

JOHN CLAY.

Witnesses:
S. GOODALL,
GUY OKE.